(No Model.)
E. A. DAVIS.
COVER FOR TOBACCO PAILS.
No. 494,465. Patented Mar. 28, 1893.
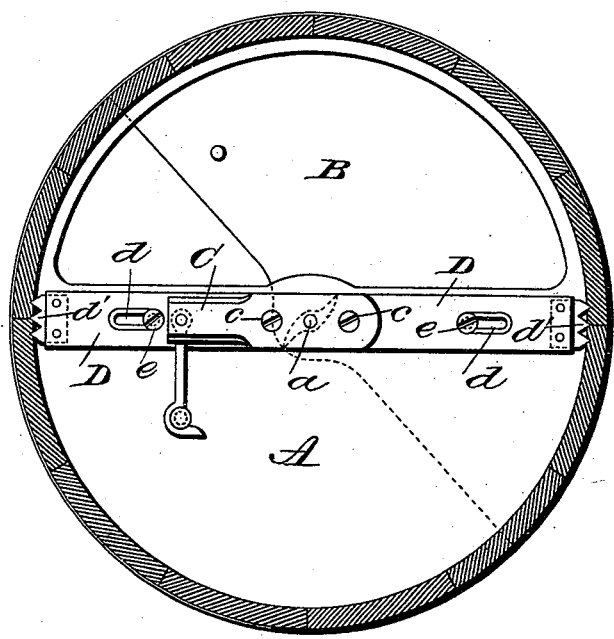
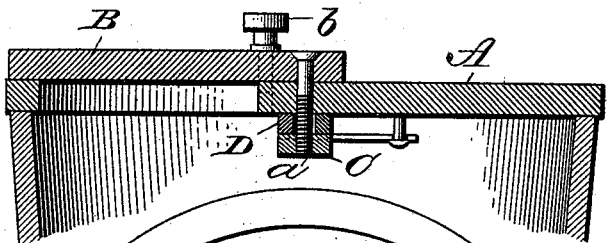
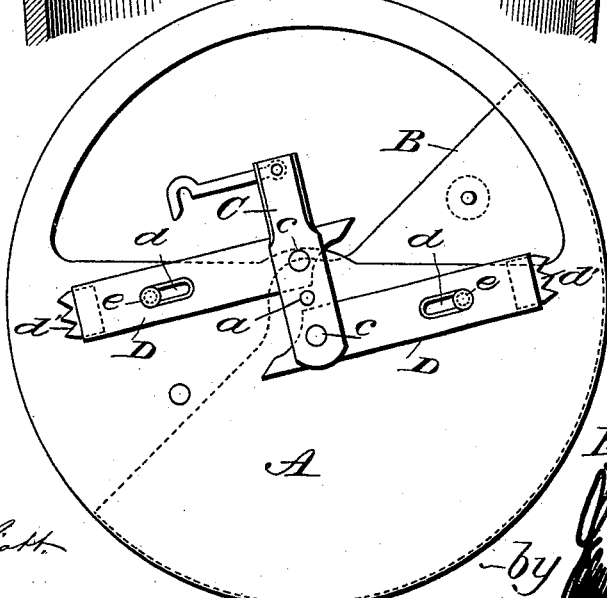
Witnesses
E. A. Davis,
Inventor

UNITED STATES PATENT OFFICE.

ERNEST A. DAVIS, OF ALBION, MICHIGAN.

COVER FOR TOBACCO-PAILS.

SPECIFICATION forming part of Letters Patent No. 494,465, dated March 28, 1893.

Application filed January 12, 1893. Serial No. 458,137. (No model.)

*To all whom it may concern:*

Be it known that I, ERNEST A. DAVIS, a citizen of the United States of America, residing at Albion, in the county of Calhoun and State of Michigan, have invented certain new and useful Improvements in Covers for Tobacco-Pails; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

The object of the invention is to provide a cover for pails or barrels, especially tobacco pails, which can be readily attached and detached; said cover consisting of a head having an opening on one side of its center over which a lid is adapted to be swung, the head being secured to the pail by means of two slotted bars attached to the under side of the same and operated by a lever, as will be hereinafter fully set forth.

In the accompanying drawings, forming part of this specification: Figure 1 is a view of the underside of the cover, showing the same secured to a pail which is partly broken away. Fig. 2 is a sectional view. Fig. 3 is a view showing the bars contracted.

A designates the cover or head, which is provided on one side of its center with an opening over which is adapted to be swung a lid B, said lid being pivoted to the cover and having a knob b, the securing screw of which passes through the lid and serves as a stop. The screw, a, upon which the lid is pivoted extends beneath the cover and forms a support for a short lever C, said lever carrying on each side of its fulcrum a pin or screw c which engage with bars D D; these bars have slots, d, beyond their connection with the lever, through which the headed screws e e attached to the cover pass. To the outer ends of the bars are attached toothed plates d' which are adapted to engage with the inner side of the pail or receptacle. The inner ends of the bars are correspondingly beveled or curved so as to abut when they are brought on a line with each other, said beveled ends being cut away to receive the screw a. The long end of the lever C carries a hook which engages with a pin on the cover so as to hold the bars in an expanded position.

I am aware that prior to my invention it has been proposed to provide a barrel top or cover with an apertured cover upon which a lid is pivoted; also that it has been proposed to attach to a cover a disk carrying a plurality of arms, so that when said disk is turned the arms will be projected or retracted, and I do not claim such construction as my invention; but What I do claim as new, and desire to secure by Letters Patent, is—

1. In combination with a cover A, having an aperture and a lid adapted to be swung over said aperture, of slotted bars D D attached to the under side of the cover, said bars being connected to each other by a lever one end of which is adapted to be moved to project within the opening in the cover, and means for retaining said lever on a line with the slotted bars, substantially as shown.

2. In combination with a cover having an aperture over which a lid is adapted to be swung, of bars movably secured to the cover and pivoted to a lever, said lever being mounted on the same screw which pivots the lid to the cover, substantially as shown, and for the purpose set forth.

3. In combination with a cover and lid connected to each other as shown, of bars D D having the ends which abut against each other inclined or beveled as shown, a lever C pivotally attached to the cover and connected to the bars D D, and serrated plates attached to the outer ends of said bars, for the purpose set forth.

In testimony whereof I affix my signature in presence of two witnesses.

ERNEST A. DAVIS.

Witnesses:
LEVI S. WARREN,
FRANK L. IRWIN.